(12) United States Patent
Leggette et al.

(10) Patent No.: US 10,956,091 B2
(45) Date of Patent: Mar. 23, 2021

(54) EXPANDING A DISPERSED STORAGE NETWORK (DSN)

(71) Applicant: International Business Machines Corporation, Armonk, NY (US)

(72) Inventors: Wesley B. Leggette, Chicago, IL (US); Manish Motwani, Chicago, IL (US); Brian F. Ober, Lake in the Hills, IL (US); Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/256,195

(22) Filed: Jan. 24, 2019

(65) Prior Publication Data

US 2019/0155510 A1 May 23, 2019

Related U.S. Application Data

(63) Continuation of application No. 15/233,712, filed on Aug. 10, 2016, now Pat. No. 10,223,036.

(51) Int. Cl.
*G06F 3/06* (2006.01)
*G06F 11/10* (2006.01)
(Continued)

(52) U.S. Cl.
CPC ............ *G06F 3/067* (2013.01); *G06F 3/0611* (2013.01); *G06F 3/0659* (2013.01); *G06F 11/1076* (2013.01); *G06F 3/064* (2013.01); *G06F 3/0619* (2013.01); *G06F 9/5016* (2013.01); *G06F 9/5083* (2013.01); *G06F 11/3006* (2013.01); *G06F 16/134* (2019.01); *G06F 16/27* (2019.01);
(Continued)

(58) Field of Classification Search
CPC ....................................................... G06F 3/067
USPC ............................................................ 714/766
See application file for complete search history.

(56) References Cited

U.S. PATENT DOCUMENTS 4,092,732 A 5/1978 Ouchi
5,454,101 A 9/1995 Mackay et al.
(Continued)

OTHER PUBLICATIONS

Chung; An Automatic Data Segmentation Method for 3D Measured Data Points; National Taiwan University; pp. 1-8; 1998.
(Continued)

*Primary Examiner* — Fritz Alphonse
(74) *Attorney, Agent, or Firm* — James Nock; Andrew D. Wright; Roberts Calderon Safran & Cole, P.C.

(57) ABSTRACT

A method begins when a read expansion condition is met for a set of encoded data slices stored in a set of storage units of a first DSN. The method continues with determining whether a difference between a pillar width number and a read threshold (RT) number is greater than or equal to the RT number. When no, the method continues with retrieving an expansion number of encoded data slices from the set of storage units and sending them to storage units of a second DSN for storage. The method continues by receiving a plurality of read requests for the set of encoded data slices, sending a first group of read requests to a RT number of storage units of the first DSN and sending a second group of requests to a second subset of storage units of the first DSN and to the storage units of the second DSN.

18 Claims, 8 Drawing Sheets

(51) Int. Cl.
*G06F 9/50* (2006.01)
*G06F 11/30* (2006.01)
*H04L 29/06* (2006.01)
*H04L 29/08* (2006.01)
*G06F 16/27* (2019.01)
*G06F 16/13* (2019.01)

(52) U.S. Cl.
CPC ...... *H04L 29/08549* (2013.01); *H04L 63/104* (2013.01); *H04L 67/1008* (2013.01); *H04L 67/1097* (2013.01); *H04L 67/42* (2013.01)

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,056,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2012/0198537 A1 | 8/2012 | Grube et al. |
| 2012/0254690 A1 | 10/2012 | Resch et al. |
| 2013/0232152 A1* | 9/2013 | Dhuse ..................... G06F 3/067 707/741 |
| 2013/0311851 A1 | 11/2013 | Cilfone et al. |
| 2014/0136571 A1 | 5/2014 | Bonvin et al. |
| 2015/0100727 A1 | 4/2015 | Baptist et al. |
| 2016/0124657 A1* | 5/2016 | Resch ..................... G06F 3/065 711/114 |
| 2018/0113651 A1* | 4/2018 | Leggette ............... G06F 3/0659 |
| 2019/0095101 A1* | 3/2019 | Leggette ................. G06F 3/067 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

(56) References Cited

OTHER PUBLICATIONS

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

List of IBM Patents or Patent Applications Treated as Related, Jul. 11, 2020, 1 page.

* cited by examiner

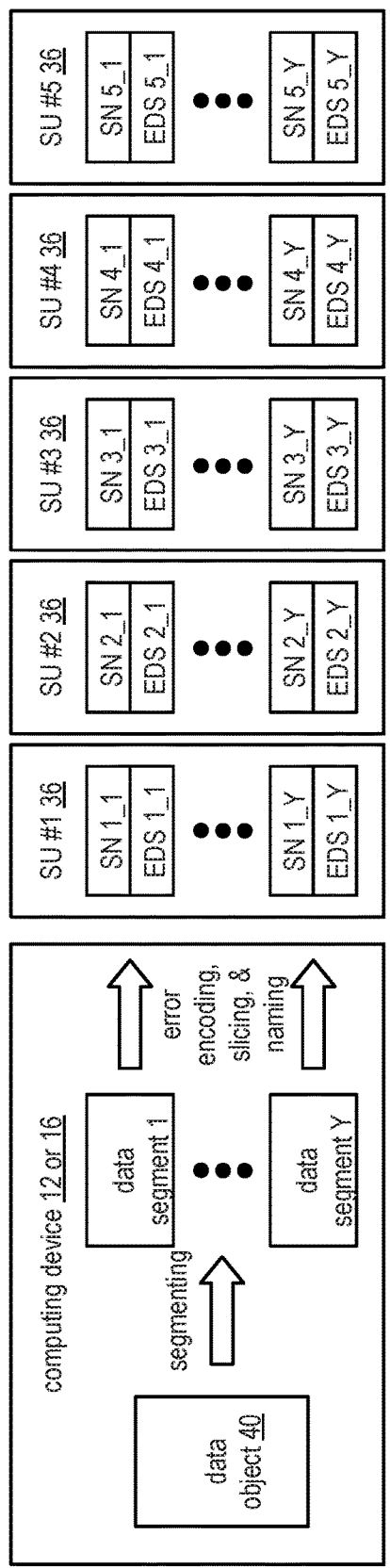
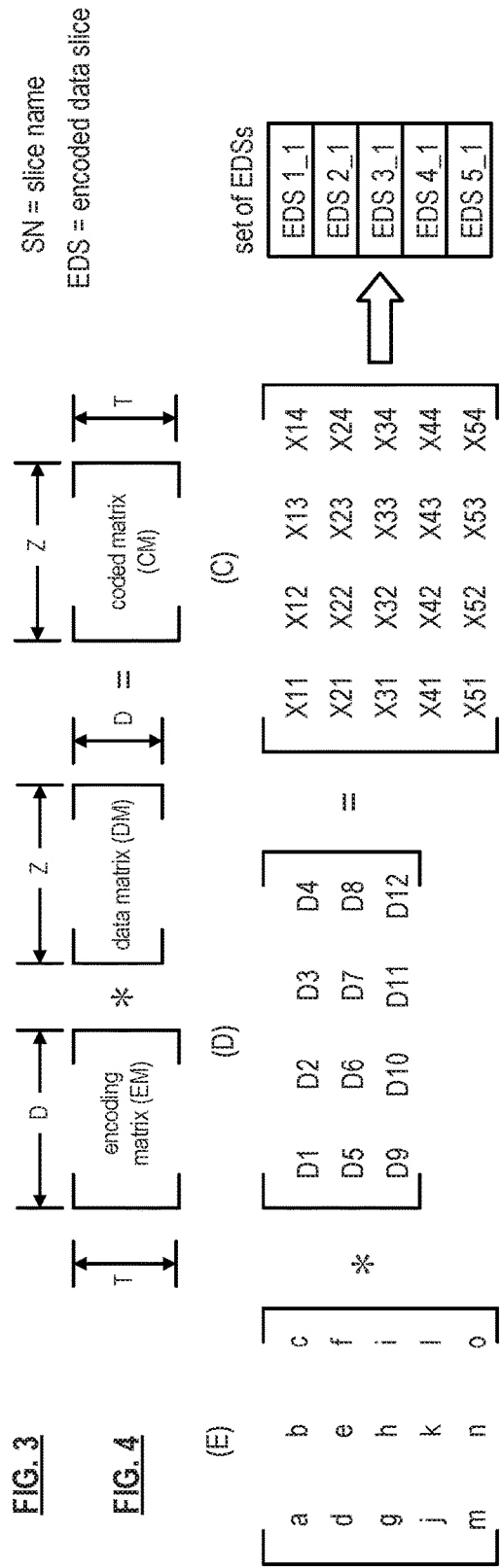

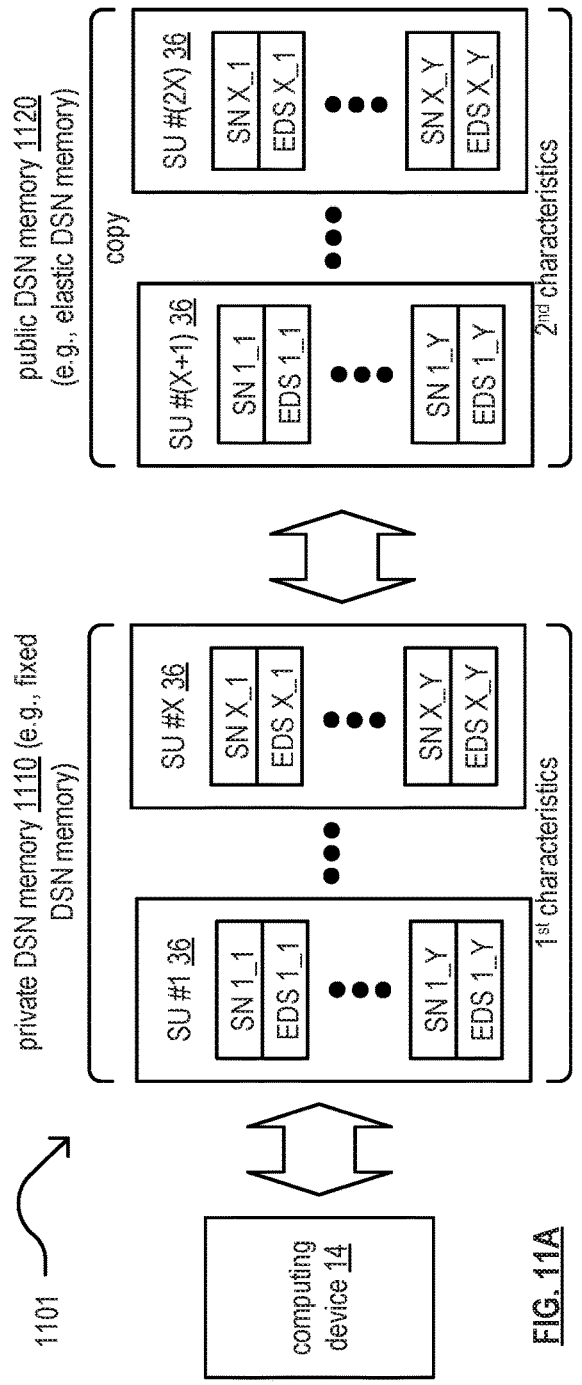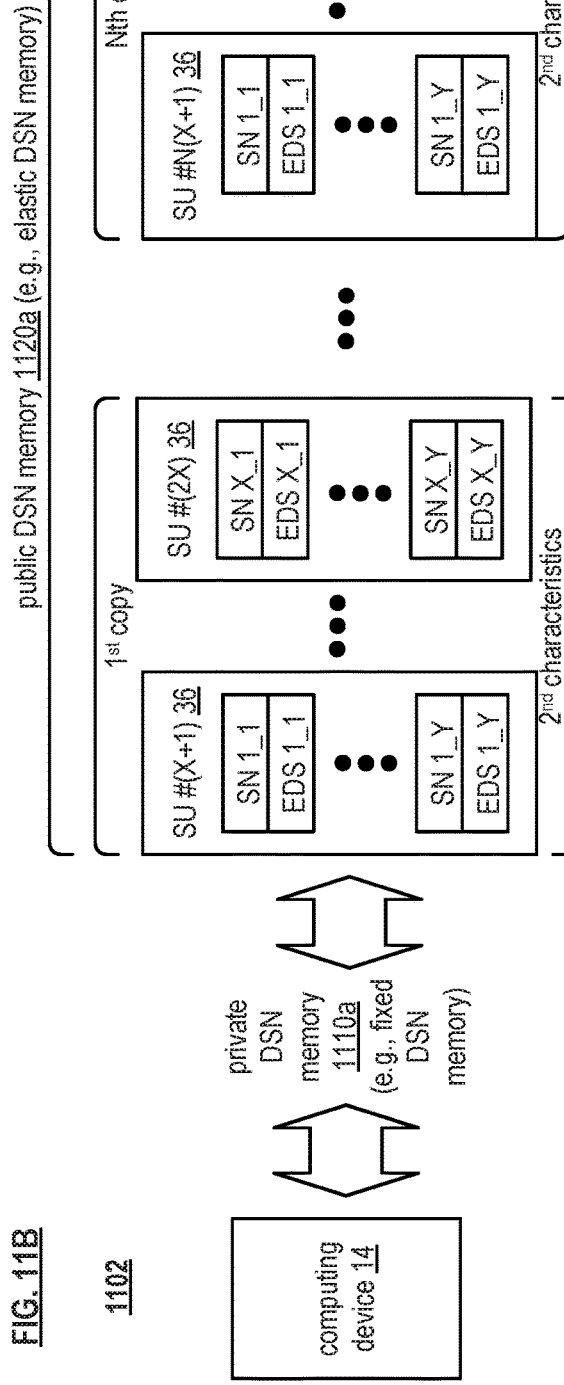

EXPANDING A DISPERSED STORAGE NETWORK (DSN)

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

In certain memory storage systems, there may be various conditions that result in degraded performance of the overall system. For example, there may be situations where the existing resources of the system cannot accommodate or service various requests made by users regarding the data stored therein. The prior art does not provide an adequate means by which a system may adequately service all such requests made by users regarding the data stored therein.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 11A is a schematic block diagram of an example of a DSN that includes a copy of data in accordance with the present invention;

FIG. 11B is a schematic block diagram of an example of a DSN that includes multiple copy of data in accordance with the present invention;

DETAILED DESCRIPTION OF THE INVENTION

Figure 1:
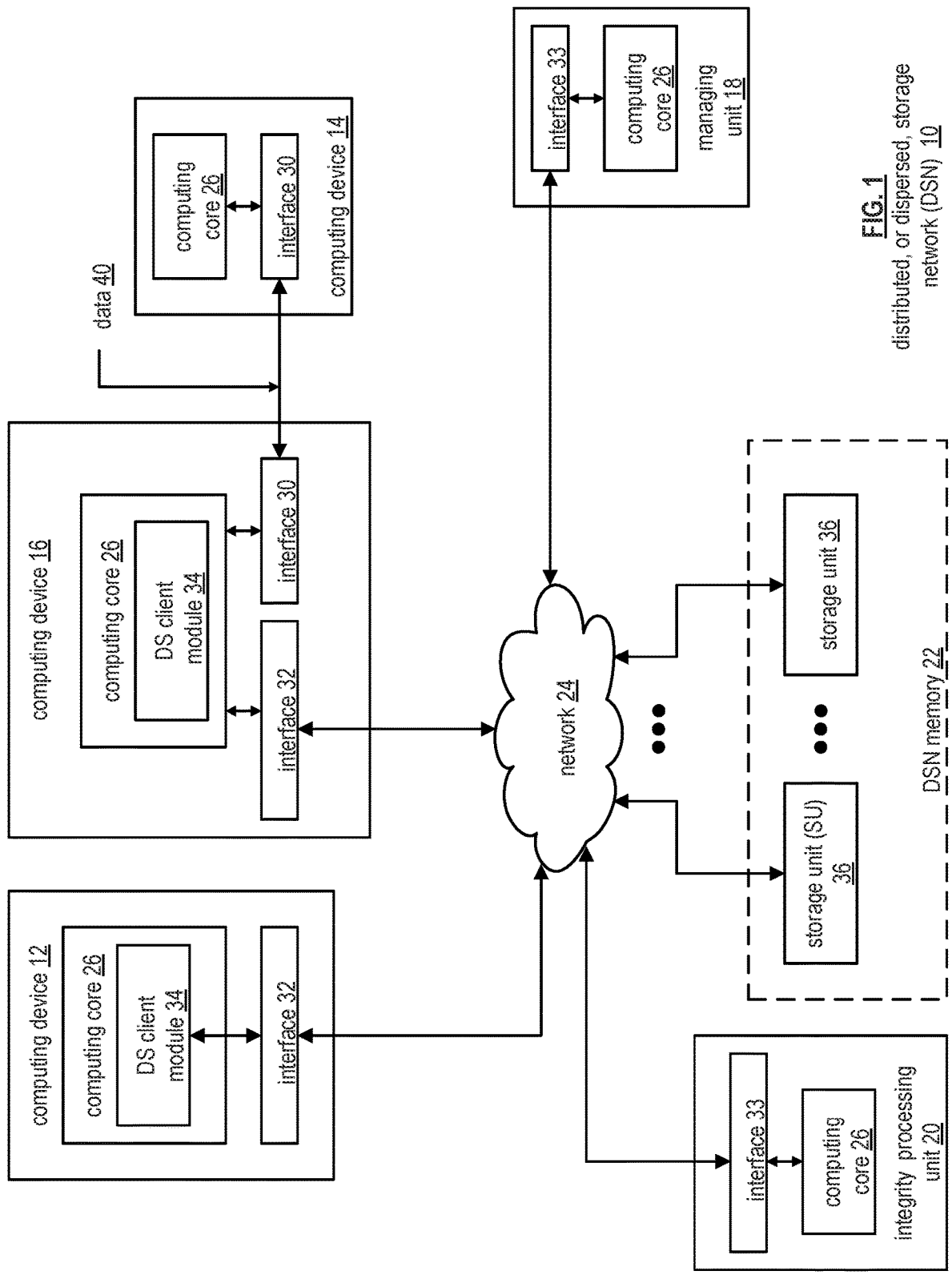
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
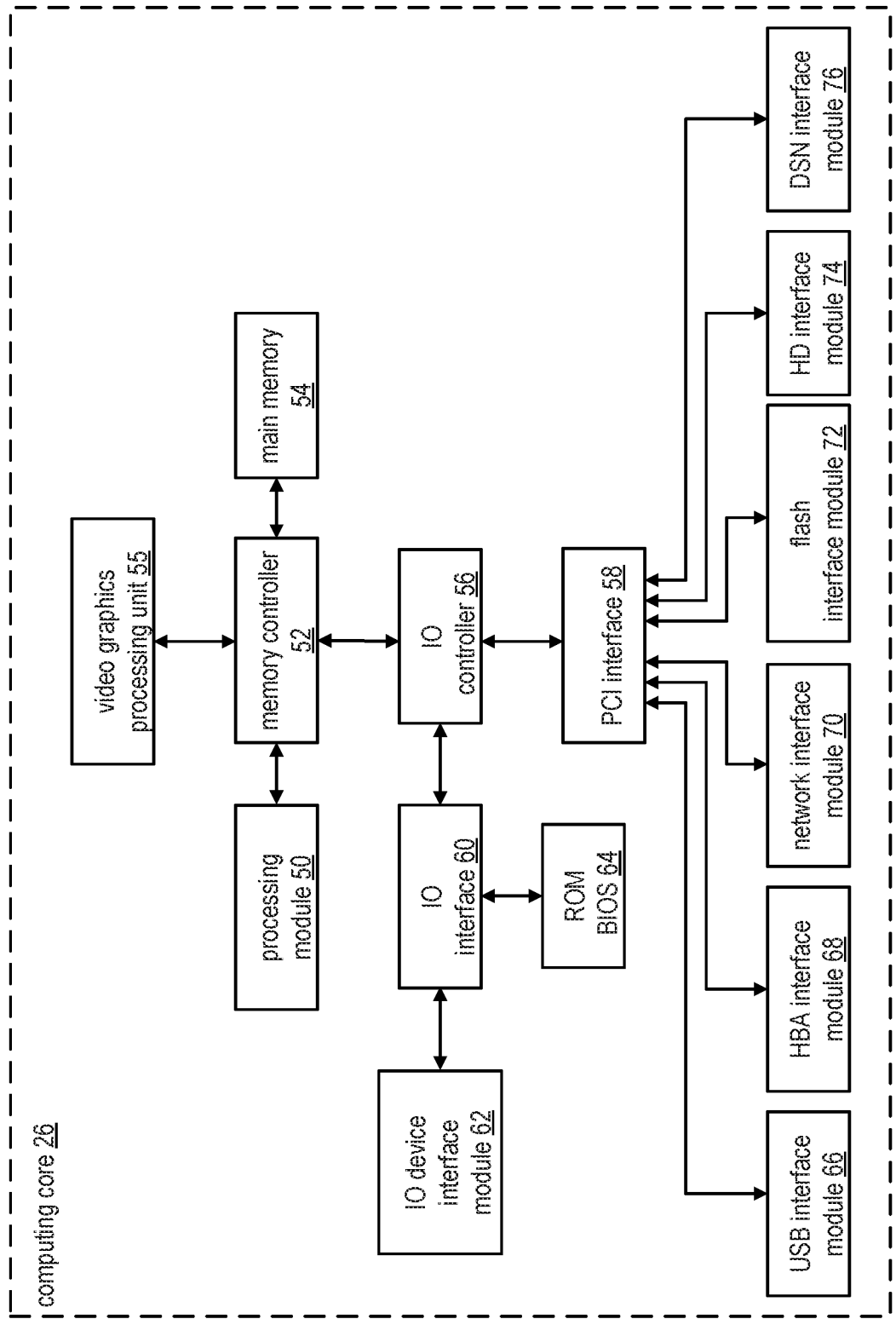
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity check-sum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
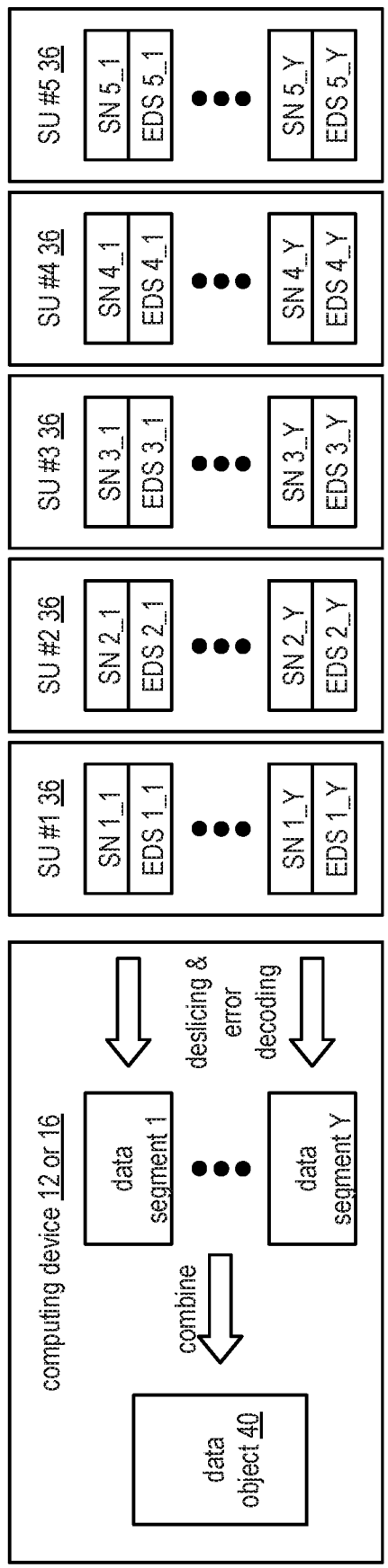
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
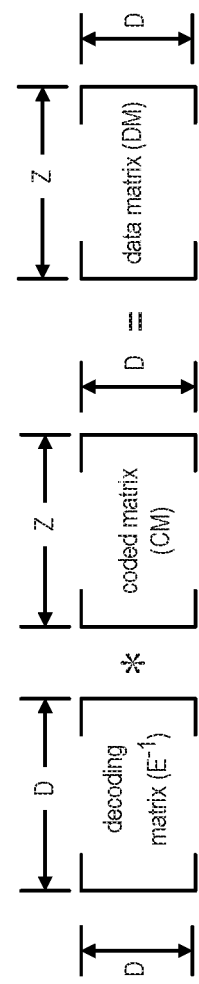
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
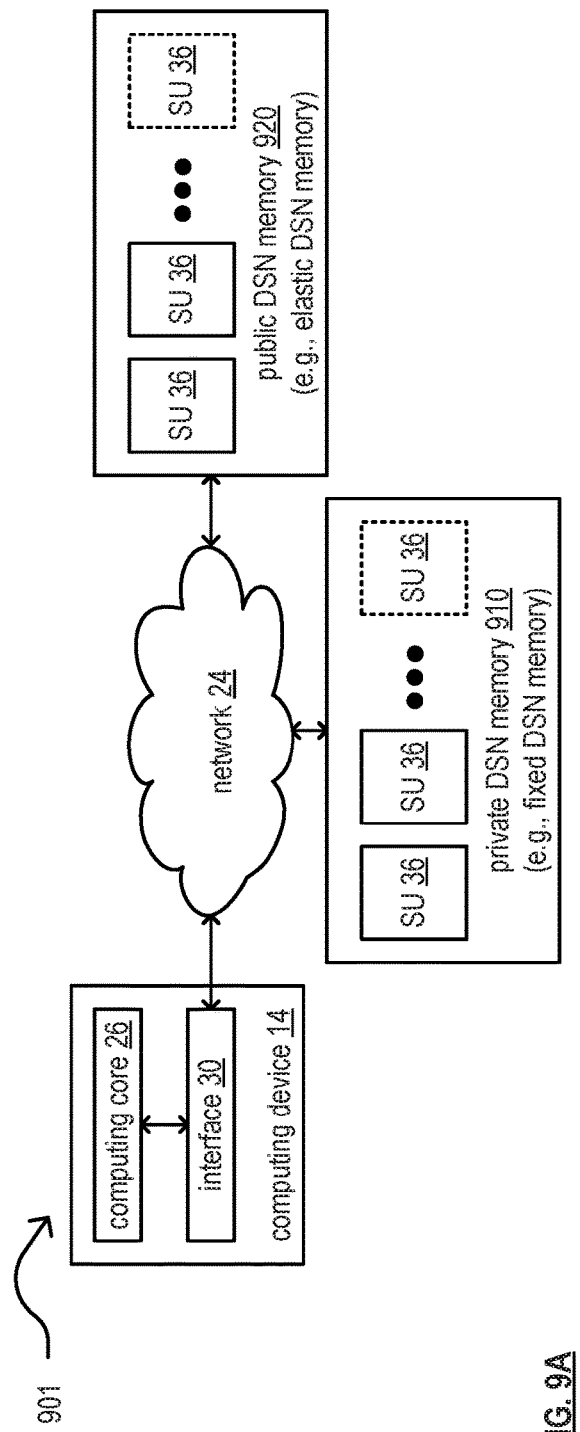
FIG. 9A is a schematic block diagram of an example of a dispersed storage network (DSN) that includes a private DSN memory (e.g., a fixed DSN memory) and a public DSN memory (e.g., an elastic DSN memory) in accordance with the present invention.

FIG. 9A is a schematic block diagram of an example 901 of a dispersed storage network (DSN) that includes a private DSN memory 910 (e.g., a fixed DSN memory) and a public DSN memory 920 (e.g., an elastic DSN memory) in accordance with the present invention. A computing device 14

(e.g., that includes a computing core 26 and interface 30) such as described with respect to FIG. 1 is in communication with a network 24. Note that while computing device 14 is used in many examples herein, any of the other devices described herein may similarly be configured to perform various operations, functions, etc. without departing from the scope and spirit of the invention. The private DSN memory 910 (e.g., a fixed DSN memory) may be viewed as a memory that is accessible only by the computing device 14 in some examples. For example, other devices (e.g., other computing devices, other DS processing units, etc.) may not be authorized to access or use the private DSN memory 910 in certain implementations.

The computing device 14 operates using on a private dispersed storage network (DSN) memory 910 that is accessible via the network 24. In some examples, the private DSN memory 910 may be viewed as a fixed DSN memory that includes a predetermined, fixed, constant, etc. amount of memory for use by the computing device 14. In some examples, the private DSN memory 910 may include a number of storage units (SUs) 36. As desired or needed in various situations, the computing device 14 is configured to expand the usable capacity of the private DSN memory for use by the computing device 14 to include the public DSN memory 920 and also a public DSN memory 920. In some examples, the public DSN memory 920 may include a number of storage units (SUs) 36. Note that the each of the private DSN memory 910 and the public DSN memory 920 may different respective numbers of SUs 36 therein. In some examples, the public DSN memory 920 may be viewed as an elastic DSN memory that includes an elastic, flexible, scalable, etc. amount of memory for use by the computing device 14 in conjunction with the private DSN memory 910. Such a public DSN memory 920 (e.g., a fixed DSN memory) may be viewed as a memory that is accessible by the computing device 14 and optionally other devices (e.g., other computing devices, other DS processing units, etc.) in some examples. For example, other devices (e.g., other computing devices, other DS processing units, etc.) may be authorized to access or use the public DSN memory 920 in certain implementations. However, note that certain portions of the public DSN memory 920 may only be respectively accessible or usable by different respective devices (e.g., computing devices, DS processing units, etc.) at different respective times in some instances.

Figure 9B:
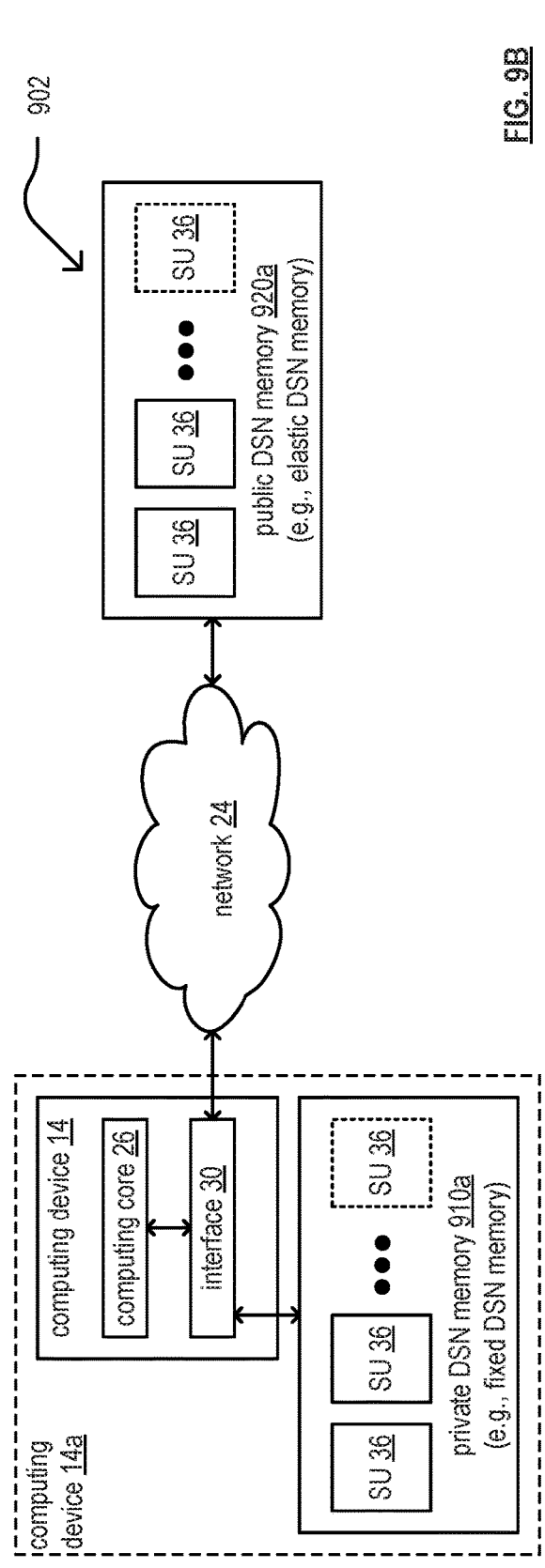
FIG. 9B is a schematic block diagram of another example of a DSN that includes a private DSN memory (e.g., a fixed DSN memory) and a public DSN memory (e.g., an elastic DSN memory) in accordance with the present invention.

FIG. 9B is a schematic block diagram of another example 902 of a DSN that includes a private DSN memory 910*a* (e.g., a fixed DSN memory) and a public DSN memory 920*a* (e.g., an elastic DSN memory) in accordance with the present invention. In this diagram, a computing device 14 (e.g., that includes a computing core 26 and interface 30) such as described with respect to FIG. 1 is in communication with a network 24. Again with respect to this diagram, note that while computing device 14 is used in many examples herein, any of the other devices described herein may similarly be configured to perform various operations, functions, etc. without departing from the scope and spirit of the invention. For example, such operations may be performed by a wireless smart phone, a laptop, a tablet, a personal computers (PC), a work station, or a video game device.

The computing device 14 operates using a private DSN memory 910*a* that is accessible directly without needing to go through the network 24. For example, the private DSN memory 910*a* is proximate or local with respect to the computing device 14 (e.g., within a same installation as the computing device 14). In other examples, an embodiment of a computing device 14*a* includes the private DSN memory 910*a* therein. Regardless of the particular implementation or manner by which the private DSN memory 910*a* is usable and accessible by the computing device 14 (or computing device 14*a*), the computing device 14 is able to use the private DSN memory 910*a* for operations to perform various operations, functions, etc. within a DSN.

Also, in some examples, the private DSN memory 910*a* may be viewed as a fixed DSN memory that includes a predetermined, fixed, constant, etc. amount of memory for use by the computing device 14. As desired or needed in various situations, the computing device 14 is configured to expand the usable capacity of the private DSN memory for use by the computing device 14 to include the private DSN memory 910*a* and also a public DSN memory 920. In some examples, the public DSN memory 920*a* may be viewed as an elastic DSN memory that includes an elastic, flexible, scalable, etc. amount of memory for use by the computing device 14 in conjunction with the private DSN memory 910. Both of the private DSN memory 910*a* and the public DSN memory 920*a* may respectively include a number of SUs 36, and each of the private DSN memory 910*a* and the public DSN memory 920*a* may different respective numbers of SUs 36 therein.

In an example of operation and implementation, the computing device 14 includes the interface 30 configured to interface and communicate with a dispersed storage network (DSN), memory that stores operational instructions, and a processing module (that may include the computing core 26 in some examples) operably coupled to the interface and to the memory, wherein the processing module, when operable within the computing device based on the operational instructions, is configured to perform various operations, functions, etc. In an example, the computing device 14 monitors for at least one condition that triggers expansion of a private DSN memory that stores a plurality of encoded data slices (EDSs).

Then, when the at least one condition that triggers the expansion of the private DSN memory that stores the plurality of EDSs is detected, the computing device 14 generates a modified copy of the plurality of EDSs that includes a read threshold number of EDSs of the plurality of EDSs and/or a write threshold number of EDSs of the plurality of EDSs. Note that a data object is segmented into a plurality of data segments. A data segment of the plurality of data segments is dispersed error encoded in accordance with dispersed error encoding parameters to produce the plurality of EDSs. The read threshold number of EDSs of the plurality of EDSs provides for reconstruction of the data segment, and the write threshold number of EDSs of the plurality of EDSs provides for a successful transfer of the plurality of EDSs from a first at least one storage location in the DSN to a second at least one storage location in the DSN.

Also, when the at least one condition that triggers the expansion of the private DSN memory that stores the plurality of EDSs is detected, the computing device 14 transmits the modified copy of a plurality of EDSs to a public DSN memory for storage within the public DSN memory. The computing device 14 then services first at least one of read request or write request associated with the plurality of EDSs based on the private DSN memory that stores the plurality of EDSs and also services second at least one of read request or write request associated with the plurality of EDSs based on public DSN memory that stores the modified copy of the plurality of EDSs.

Figure 10:
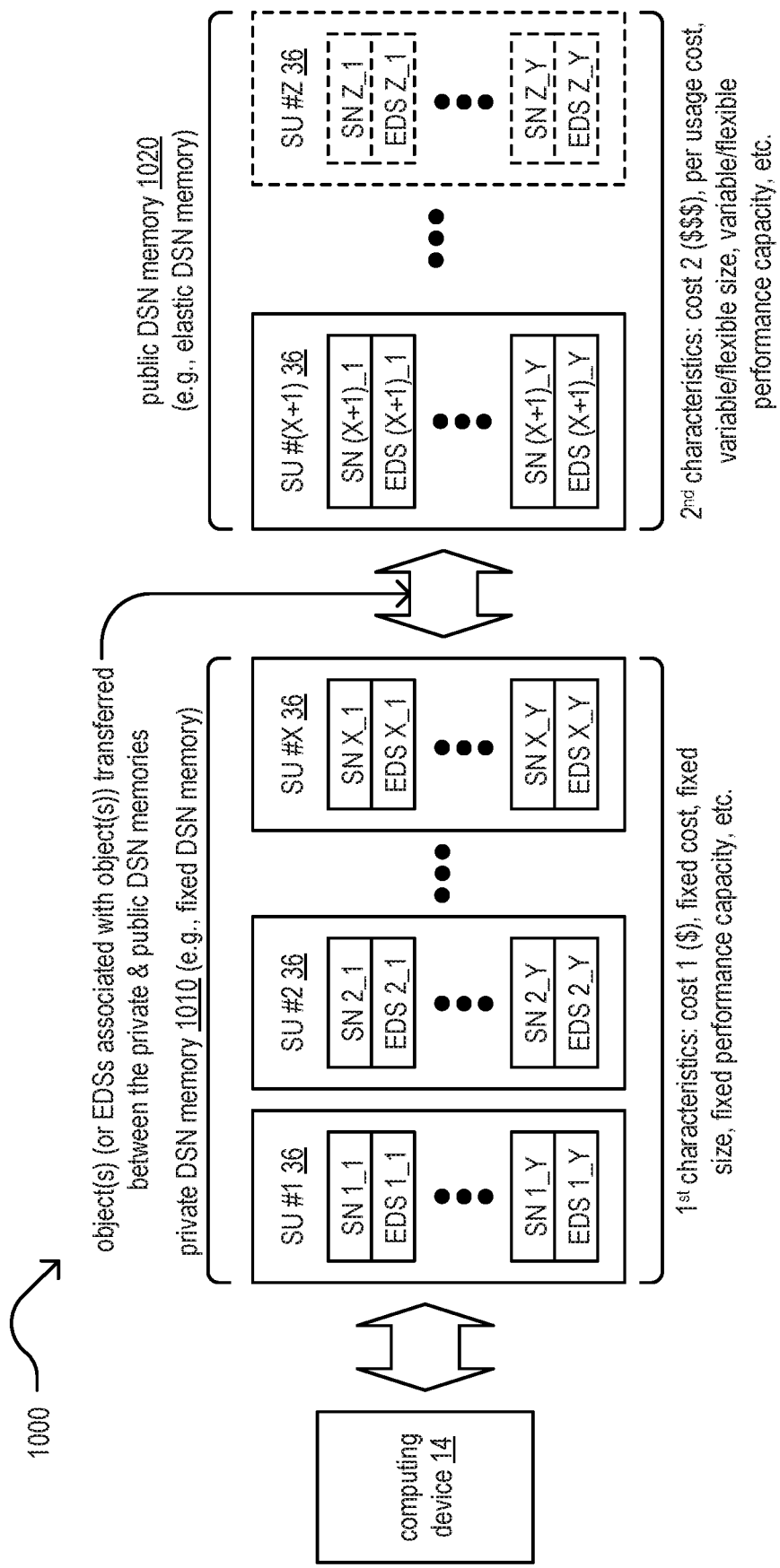
FIG. 10 is a schematic block diagram of an example of a DSN that includes extension of DSN memory from a private DSN memory (e.g., a fixed DSN memory) also to include a public DSN memory (e.g., an elastic DSN memory) in accordance with the present invention.

FIG. 10 is a schematic block diagram of an example 1000 of a DSN that includes extension of DSN memory from a private DSN memory 1010 (e.g., a fixed DSN memory) also to include a public DSN memory 1020 (e.g., an elastic DSN memory) in accordance with the present invention. In this diagram, a computing device 14 uses a private DSN memory 1010 that can be expanded to include a public DSN memory 1020 based on certain condition(s). For example, the private DSN memory 1010 includes a number of SUs (e.g., shown as SU #1 36, SU #2 36, and up to SU #X 36, where X is a positive integer). The public DSN memory 1020 also includes a number of SUs (e.g., shown as SU #(X+1) 36 and up to SU #Z 36, where Z is a positive integer greater than X). The respective slice names (SN) and EDS labels may be understood such as with respect to FIG. 3-FIG. 8, among other portions of the originally filed specification (including figures).

Note that the private DSN memory 1010 (e.g., a fixed DSN memory) and the public DSN memory 1020 (e.g., an elastic DSN memory) may have different characteristics. For example, the private DSN memory 1010 may have a first cost, a fixed cost, a fixed size, a fixed performance capacity, a fixed performance, etc. The public DSN memory 1020 may have a second cost, a per usage cost, a variable/flexible size, a variable/flexible performance capacity, a variable/flexible performance, etc. For one or more various reasons in certain examples, the computing device 14 operates selectively to use the public DSN memory 1020 based on consideration of the various characteristics of the private DSN memory 1010 and the public DSN memory 1020 and based on comparison of any differences of characteristics of the private DSN memory 1010 and the public DSN memory 1020.

As an example, as needed, the computing device 14 can expand its usable memory from the private DSN memory 1010 to include the public DSN memory 1020 based on a given condition (e.g., such as in cases of temporary bursts in inbound data, the total quantity of data to be stored can exceed the storage capacities of the fixed DSN memory) and scale back from the public DSN memory 1020 to use less of the public DSN memory 1020 than before or none of the public DSN memory 1020 when the private DSN memory 1010 is adequate to service the needs of the computing device 14. For example, if the cost to use the public DSN memory 1020 is greater than using the private DSN memory 1010 (and note the cost of the private DSN memory 1010 may have already been paid for so that ongoing use thereof is essentially cost-free), then the computing device 14 may choose to use only the private DSN memory 1010 except when the private DSN memory 1010 cannot service the needs of the computing device 14 (e.g., for various reasons such as to save money).

FIG. 11A is a schematic block diagram of an example 1101 of a DSN that includes a copy of data in accordance with the present invention. This diagram shows data, information, etc. that is stored within a private DSN memory 1110 (e.g., a fixed DSN memory) and a copy of that data, information, etc. that provided to a public DSN memory 1120 (e.g., an elastic DSN memory). The private DSN memory 1110 and the public DSN memory 1120 may have different respective characteristics and a computing device may selectively use the public DSN memory 1120 to augment or expand the private DSN memory 1110 based on one or more considerations. In this diagram, the private DSN memory 1110 includes a number of SUs (e.g., shown as SU #1 36 and up to SU #X 36, where X is a positive integer), and the public DSN memory 1120 includes a number of SUs (e.g., shown as SU #(X+1) 36 and up to SU #(2X) 36, where X is a positive integer). Note that while each of the private DSN memory 1110 and the public DSN memory 1120 are shown as having a same number of SUs in this diagram, other examples may include different respective numbers of SUs.

FIG. 11B is a schematic block diagram of an example 1102 of a DSN that includes multiple copy of data in accordance with the present invention. Within this diagram, data, information, etc. that is stored within a private DSN memory 1110a (e.g., a fixed DSN memory) and multiple copies (e.g., $1^{st}$ copy and so on to an $N^{th}$ copy of that data, information, etc. that provided to a public DSN memory 1120a (e.g., an elastic DSN memory). The private DSN memory 1110 and the public DSN memory 1120 may have different respective characteristics and a computing device may selectively use the public DSN memory 1120 to augment or expand the private DSN memory 1110 based on one or more considerations. Note that the public DSN memory 1120a includes multiple sets of SUs that store the respective copies of the data, information, etc. that is stored within a private DSN memory 1110a. Note that while each of the private DSN memory 1110a and the respective sets of SUs within the public DSN memory 1120a are shown as having a same number of SUs in this diagram, other examples may include different respective numbers of SUs within the respective sets of SUs within the public DSN memory 1120a.

In an example of operation and implementation, the expansion of the private DSN memory 1010 to include the public DSN memory 1020 may be viewed as being a hybrid cloud type of DSN that combines at least one mostly fixed resource/harder to scale DSN memory that us usable within the system such as by the computing device 14. A private DSN memory (e.g., a fixed DSN memory) may be operative in combination with at least one other elastically scalable or practically unlimited public DSN memory (e.g., an elastic DSN memory). For example, a local on-premises DSN memory (such as a private DSN memory, which can be a fixed DSN memory) with a DSN memory may be operated as a public utility or service. Often, the fixed DSN memory has first one or more characteristics (e.g., a fixed cost), while the elastic DSN may have second one or more characteristics (e.g., a marginal cost per usage). When cost structures differ, a device (e.g., a computing device, a DS processing unit, etc.) may optimizes how and when it chooses to use the various DSN memories it has access to.

For example, in cases of temporary bursts in inbound data, the total quantity of data to be stored can exceed the storage capacities of the fixed DSN memory. In this case, the device (e.g., a computing device, a DS processing unit, etc.) may off-load the excess data to the elastic DSN memory during the period the fixed DSN memory has no more storage resources. At a future time, when slices are removed from the fixed DSN memory, or when storages resources are added to the fixed DSN memory the device (e.g., a computing device, a DS processing unit, etc.) may initiate a transfer of slices or objects stored on the remote DSN memory back to the fixed DSN memory, thereby lowering marginal costs of operation. A device (e.g., a computing device, a DS processing unit, etc.) may also utilize the elastic DSN memory during bursts of performance. Owing to the fixed and limited resources in the fixed DSN memory, the fixed DSN memory also has a fixed performance capacity. In the case that data is coming in to be stored faster than the ds units of the fixed DSN memory can process it, the device (e.g., a computing device, a DS processing unit, etc.) will offload the excess traffic to the elastic DSN memory. At a later time, when aggregate performance utilization has dropped, the device (e.g., a computing device, a DS processing unit, etc.) can transfer the objects and slices back to the fixed DSN memory to lower costs. Similarly, when an object becomes frequently accessed (e.g., a hot object), and the number or frequency of requests for this object exceeds the fixed DSN memory's capacity to deliver, the device (e.g., a computing device, a DS processing unit, etc.) can transfer at least one instance of this hot object to the elastic DSN memory, thereby increasing the system's ability to deliver the hot object to requesters. As before, when the popularity of this object cools, the device (e.g., a computing device, a DS processing unit, etc.) may remove the excess instances of the object on the elastic DSN memory.

Figure 12B:
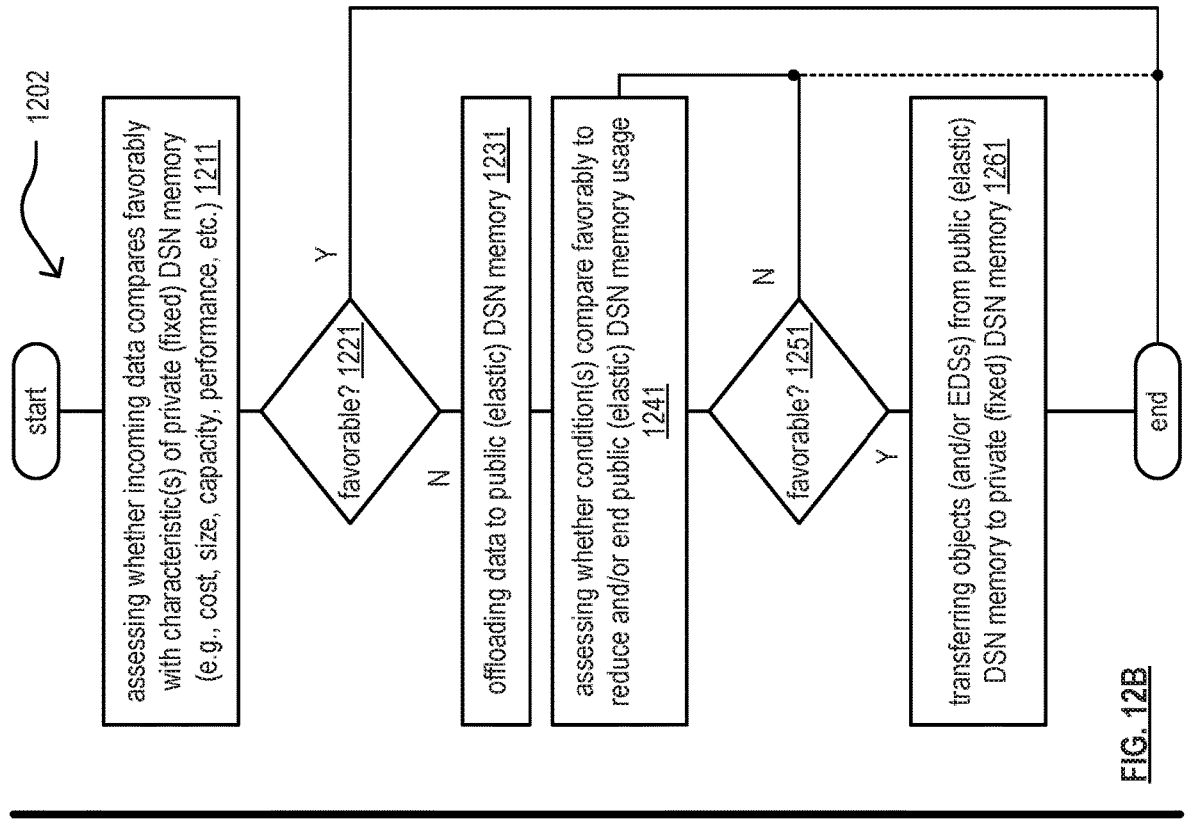
FIG. 12B is a diagram illustrating another embodiment of a method for execution by one or more computing devices in accordance with the present invention.
Figure 12A:
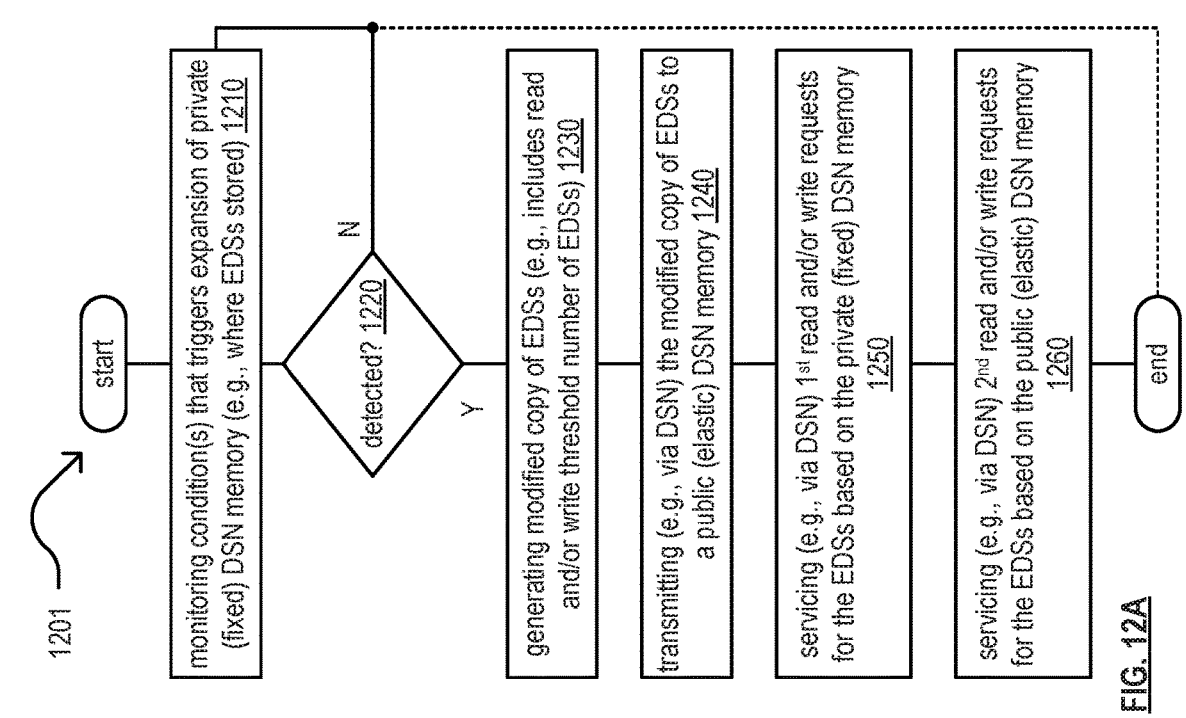
FIG. 12A is a diagram illustrating an embodiment of a method for execution by one or more computing device in accordance with the present invention.

FIG. 12A is a diagram illustrating an embodiment of a method 1201 for execution by one or more computing device in accordance with the present invention. The method 1201 operates by monitoring for at least one condition that triggers expansion of a private dispersed storage network (DSN) memory that stores a plurality of encoded data slices (EDSs) in step 1210. When the at least one condition that triggers the expansion of the private DSN memory that stores the plurality of EDSs is detected in step 1220, the method 1201 operates by generating a modified copy of the plurality of EDSs that includes a read threshold number of EDSs of the plurality of EDSs and/or a write threshold number of EDSs of the plurality of EDSs, wherein a data object is segmented into a plurality of data segments in step 1230. Alternatively, when the at least one condition that triggers the expansion of the private DSN memory that stores the plurality of EDSs is not detected in step 1220, the method 1201 branches back to step 1210 or ends.

Note that a data segment of the plurality of data segments is dispersed error encoded in accordance with dispersed error encoding parameters to produce the plurality of EDSs, wherein the read threshold number of EDSs of the plurality of EDSs provides for reconstruction of the data segment. The write threshold number of EDSs of the plurality of EDSs provides for a successful transfer of the plurality of EDSs from a first at least one storage location in the DSN to a second at least one storage location in the DSN.

Then, the method 1201 operates by transmitting (e.g., via a dispersed storage network (DSN)), the modified copy of a plurality of EDSs to a public DSN memory for storage within the public DSN memory in step 1240. The method 1201 then operates by servicing, via the DSN, first at least one of read request or write request associated with the plurality of EDSs based on the private DSN memory that stores the plurality of EDSs in step 1250. The method 1201 operates by servicing (e.g., via the DSN) second at least one of read request or write request associated with the plurality of EDSs based on public DSN memory that stores the modified copy of the plurality of EDSs in step 1260.

In some examples, the method 1201 operates by retrieving (e.g., via the DSN) at least some of the modified copy of the plurality of EDSs from the public DSN memory for storage within the private DSN or provide instruction to the public DSN memory for deletion of the modified copy of the plurality of EDSs from the public DSN memory when the at least one condition that triggers the expansion of the private DSN memory that stores the plurality of EDSs is detected as substantially subsided.

In various examples, the at least one condition that triggers the expansion of the private DSN memory that stores the plurality of EDSs being substantially subsided includes any one or more of removal of at least some of currently stored data within the private DSN memory so that remaining currently stored data within the private DSN memory is below a storage capacity threshold associated with the private DSN memory, addition of DSN memory to the private DSN memory to increase the storage capacity threshold associated with the private DSN memory, a change in operational status of available memory access resources of the private DSN memory to service at least one of read requests or write requests associated the currently stored data within the private DSN memory, and/or at least one of read requests or write requests associated with the currently stored data within the private DSN memory falling below a private DSN memory access threshold.

Note also that the modified copy of the plurality of EDSs can includes fewer than all of the plurality of EDSs. For example, if the modified copy of the plurality of EDSs may include only a read threshold number of EDSs of the plurality of EDSs and/or a write threshold number of EDSs of the plurality of EDSs.

In even other examples, the at least one condition that triggers the expansion of the private DSN memory that stores the plurality of EDSs includes any one or more of currently stored data within the private DSN memory exceeds a storage capacity threshold associated with the private DSN memory, currently stored data within the private DSN memory and expected inbound data to be stored within the private DSN memory is forecast to exceed the storage capacity threshold associated with the private DSN memory, the currently stored data within the private DSN memory and actual inbound data to be stored within the private DSN memory exceed the storage capacity associated with the private DSN memory, a change in operational status of available memory access resources of the private DSN memory to service at least one of read requests or write requests associated the currently stored data within the private DSN memory, and/or at least one of read requests or write requests associated with the currently stored data within the private DSN memory exceeds a private DSN memory access threshold.

In addition, in some examples, the private DSN memory includes a first one or more storage units (SUs) within the DSN, and the public DSN memory includes a second one or more SUs within the DSN. In even other examples, the private DSN memory includes a first virtual memory block that is serviced based on one or more storage units (SUs) within the DSN, and the public DSN memory includes a second virtual memory block that is serviced based, at least in part, on at least one SU of the one or more SUs within the DSN.

FIG. 12B is a diagram illustrating another embodiment of a method 1202 for execution by one or more computing devices in accordance with the present invention. The method 1202 operates by assessing whether incoming data compares favorably with one or more characteristics of private (e.g., fixed) DSN memory in step 1211. Examples of characteristics of the private DSN memory 1010 can included cost, size, capacity, performance, etc.

When the incoming data compares favorably, the method 1202 ends. Alternatively, when the incoming data compares unfavorably, the method 1202 branches and operates by offloading data to the public (elastic) DSN memory in step 1231.

Then, the method 1202 operates by assessing whether one or more conditions characteristics of the public (e.g., elastic) DSN memory compares favorably without reduce and/or end usage of the public (e.g., elastic) DSN memory in step 1241.

When the one or more conditions characteristics of the public (e.g., elastic) DSN memory compares unfavorably, the method 1202 ends loops back to step 1241 ore ends.

When the one or more conditions characteristics of the public (e.g., elastic) DSN memory compares favorably, the method 1202 branches and operates by transferring objects (and/or EDSs associated with the objects) from the public (e.g., elastic) DSN memory to the private (e.g., fixed) DSN memory in step 1261.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a computing device of a dispersed storage network (DSN) comprises:
   when a read expansion condition is met for a set of encoded data slices that is stored in a set of storage units of a first DSN, wherein the set of encoded data slices includes a pillar width number of encoded data slices, a read threshold number of encoded data slices, and a decode threshold number of encoded data slices, wherein the decode threshold is less than the pillar width number and is the minimum number of encoded data slices needed to recover a data segment:
   determining whether a difference between the pillar width number and the read threshold number is greater than or equal to the read threshold number:
   when the difference is less than the read threshold number:
      retrieving an expansion number of encoded data slices of the set of encoded data slices from a first subset of storage units in the set of storage units, wherein the expansion number is equal to or greater than the read threshold number minus the difference, and wherein the expansion number is less than the read threshold number;
   sending the expansion number of encoded data slices to storage units of a second DSN for storage therein;
   receiving a plurality of read requests for the set of encoded data slices:
   sending a first group of the plurality of read requests to a read threshold number of storage units of the set of storage units of the first DSN for processing, wherein the read threshold number of storage units include the first subset of storage units; and
   sending a second group of the plurality of read requests to a second subset of storage units of the set of storage units of the first DSN and to the storage units of the second DSN for processing, wherein a number of storage units in the second subset and the storage units is equal to or greater than the read threshold number.

2. The method of claim 1 further comprises:
   when the difference is equal to or greater than the read threshold number:
      retrieving a read threshold number of encoded data slices of the set of encoded data slices from some of the storage units in the set of storage units;
      sending the read threshold number of encoded data slices to a read threshold number of storage units of a second DSN for storage therein;
   receiving a plurality of read requests for the set of encoded data slices:
   sending a first group of the plurality of read requests to the set of storage units of the first DSN for processing; and
   sending a second group of the plurality of read requests to the read threshold number of storage units of the second DSN for processing.

3. The method of claim 2, wherein when the read expansion condition is no longer met:
   deleting one of:
   the expansion number of encoded data slices stored in the second DSN; and
   the read threshold number of encoded data slices stored in the second DSN.

4. The method of claim 1, wherein the read expansion condition includes one or more of:
   a change in operational status of available memory access resources of the first DSN to service read requests associated the set of encoded data slices within the first DSN; and
   read requests associated with the set of encoded data slices within the first DSN exceeds a first DSN access threshold.

5. The method of claim 1 further comprising:
   when a write expansion condition is met for multitudes of sets of encoded data slices that are to be stored in the set of storage units of the first DSN, wherein a write threshold number of encoded data slices are required to be stored for a write request to be deemed successful:
   determining whether a second difference between the pillar width number and a write threshold number is greater than or equal to the write threshold number:

when the second difference is less than the write threshold number:
: determining a write expansion number of storage units of a second DSN, wherein the write expansion number is equal to or greater than the write threshold number minus the second difference, and wherein the write expansion number is less than the write threshold number;
: receiving a plurality of write requests for the multitudes of sets of encoded data slices;
: sending a first group of the plurality of write requests to a write threshold number of storage units of the set of storage units of the first DSN for processing; and
: sending a second group of the plurality of write requests to other storage units of the first DSN and to the write expansion number of storage units of the second DSN for processing, wherein a number of storage units in the other storage units and the write expansion number of storage units is equal to or greater than the write threshold, and wherein the write expansion number of storage units stores a write expansion number of encoded data slices for each write request of the plural of write requests.

6. The method of claim 5 further comprises:
when the second difference is greater than or equal to the write threshold number:
determining a write threshold number of storage units of the second DSN;
receiving a plurality of write requests for the multitudes of sets of encoded data slices;
sending a first group of the plurality of write requests to the set of storage units of the first DSN for processing; and
sending a second group of the plurality of write requests to the write threshold number of storage units of the second DSN for processing, wherein the second group includes one or more write threshold number of sets of encoded data slices.

7. The method of claim 6, wherein when the write expansion condition is no longer met:
sending one of:
: the one or more write threshold number of sets of encoded data slices to storage units of the first DSN; and
: the write expansion number of encoded data slices for each write request to the storage units of the first DSN; and
deleting one of:
: the one or more write threshold number of sets of encoded data slices stored in the second DSN; and
: the write expansion number of encoded data slices for each write request stored in the second DSN.

8. The method of claim 5, wherein the write expansion condition includes one or more of:
a change in memory capacity associated with the first DSN;
currently stored data within the first DSN and expected inbound data to be stored within the first DSN is forecast to exceed a storage capacity threshold associated with the first DSN;
the currently stored data within the first DSN and actual inbound data to be stored within the first DSN exceed the storage capacity associated with the first DSN;
a change in operational status of available memory access resources of the first DSN to service write requests associated the currently stored data within the first DSN; and write requests associated with the currently stored data within the first DSN exceeds a first DSN access threshold.

9. The method of claim 1, wherein
the first DSN includes one or more private storage units (SUs); and
the second DSN includes one or more public SUs.

10. A computing device of a dispersed storage network (DSN) comprises:
an interface;
memory; and
a processing module operably coupled to the interface and the memory, wherein the processing module is operable to:
when a read expansion condition is met for a set of encoded data slices that is stored in a set of storage units of a first DSN, wherein the set of encoded data slices includes a pillar width number of encoded data slices, a read threshold number of encoded data slices, and a decode threshold number of encoded data slices, wherein the decode threshold is less than the pillar width number and is the minimum number of encoded data slices needed to recover a data segment:
determine whether a difference between the pillar width number and the read threshold number is greater than or equal to the read threshold number:
when the difference is less than the read threshold number:
: retrieve, via the interface, an expansion number of encoded data slices of the set of encoded data slices from a first subset of storage units in the set of storage units,
: wherein the expansion number is equal to or greater than the read threshold number minus the difference, and wherein the expansion number is less than the read threshold number;
: send, via the interface, the expansion number of encoded data slices to storage units of a second DSN for storage therein;
: receive, via the interface, a plurality of read requests for the set of encoded data slices:
: send, via the interface, a first group of the plurality of read requests to a read threshold number of storage units of the set of storage units of the first DSN for processing, wherein the read threshold number of storage units include the first subset of storage units; and
: send, via the interface, a second group of the plurality of read requests to a second subset of storage units of the set of storage units of the first DSN and to the storage units of the second DSN for processing, wherein a number of storage units in the second subset and the storage units is equal to or greater than the read threshold number.

11. The computing device of claim 10, wherein the processing module is further operable to:
when the difference is equal to or greater than the read threshold number:
: retrieve, via the interface, a read threshold number of encoded data slices of the set of encoded data slices from some of the storage units in the set of storage units;
: send, via the interface, the read threshold number of encoded data slices to a read threshold number of storage units of a second DSN for storage therein;
: receive, via the interface, a plurality of read requests for the set of encoded data slices:

sending a first group of the plurality of read requests to the set of storage units of the first DSN for processing; and send, via the interface, a second group of the plurality of read requests to the read threshold number of storage units of the second DSN for processing.

12. The computing device of claim 11, wherein when the read expansion condition is no longer met, the processing module is further operable to:

delete one of:
the expansion number of encoded data slices stored in the second DSN; and
the read threshold number of encoded data slices stored in the second DSN.

13. The computing device of claim 10, wherein the processing module is operable to determine the read expansion condition by one or more of:

determining a change in operational status of available memory access resources of the first DSN to service read requests associated the set of encoded data slices within the first DSN; and determining read requests associated with the set of encoded data slices within the first DSN exceeds a first DSN access threshold.

14. The computing device of claim 10, wherein the processing module is further operable to:

when a write expansion condition is met for multitudes of sets of encoded data slices that are to be stored in the set of storage units of the first DSN, wherein a write threshold number of encoded data slices are required to be stored for a write request to be deemed successful:

determine whether a second difference between the pillar width number and the write threshold number is greater than or equal to the write threshold number; and when the second difference is less than the write threshold number:

determine a write expansion number of storage units of a second DSN, wherein the write expansion number is equal to or greater than the write threshold number minus the second difference, and wherein the write expansion number is less than the write threshold number;

receive, via the interface, a plurality of write requests for the multitudes of sets of encoded data slices;

send, via the interface, a first group of the plurality of write requests to a write threshold number of storage units of the set of storage units of the first DSN for processing; and send, via the interface, a second group of the plurality of write requests to other storage units of the first DSN and to the write expansion number of storage units of the second DSN for processing, wherein a number of storage units in the other storage units and the write expansion number of storage units is equal to or greater than the write threshold, and wherein the write expansion number of storage units stores a write expansion number of encoded data slices for each write request of the plural of write requests.

15. The computing device of claim 14, wherein the processing module is further operable to:

when the second difference is greater than or equal to the write threshold number:

determine a write threshold number of storage units of the second DSN;

receive, via the interface, a plurality of write requests for the multitudes of sets of encoded data slices;

send, via the interface, a first group of the plurality of write requests to the set of storage units of the first DSN for processing; and send, via the interface, a second group of the plurality of write requests to the write threshold number of storage units of the second DSN for processing, wherein the second group includes one or more write threshold number of sets of encoded data slices.

16. The computing device of claim 15, wherein when the write expansion condition is no longer met, the processing module is operable to:

send, via the interface, one of:
the one or more write threshold number of sets of encoded data slices to storage units of the first DSN; and
the write expansion number of encoded data slices for each write request to the storage units of the first DSN; and delete one of:
the one or more write threshold number of sets of encoded data slices stored in the second DSN; and
the write expansion number of encoded data slices for each write request stored in the second DSN.

17. The computing device of claim 14, wherein the processing module is operable to determine the write expansion condition by one or more of:

determining a change in memory capacity associated with the first DSN;

determining currently stored data within the first DSN and expected inbound data to be stored within the first DSN is forecast to exceed a storage capacity threshold associated with the first DSN;

determining the currently stored data within the first DSN and actual inbound data to be stored within the first DSN exceed the storage capacity associated with the first DSN;

determining a change in operational status of available memory access resources of the first DSN to service write requests associated the currently stored data within the first DSN; and determining write requests associated with the currently stored data within the first DSN exceeds a first DSN access threshold.

18. The computing device of claim 10 further comprises:
the first DSN includes one or more private storage units (SUs); and
the second DSN includes one or more public SUs.

* * * * *